(12) United States Patent
Yu et al.

(10) Patent No.: US 12,119,768 B2
(45) Date of Patent: Oct. 15, 2024

(54) MOTOR DRIVING APPARATUS AND METHOD FOR CONTROLLING THE SAME

(71) Applicants: Hyundai Motor Company, Seoul (KR); Kia Corporation, Seoul (KR)

(72) Inventors: Jung Mo Yu, Seongnam-Si (KR); Yong Jae Lee, Yongin-Si (KR); Hyun Jae Lim, Hwaseong-Si (KR); Young Ho Chae, Gwangmyeong-Si (KR); Young Kwan Ko, Seoul (KR); Jang Yoon Jeong, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 17/889,315

(22) Filed: Aug. 16, 2022

(65) Prior Publication Data

US 2023/0253905 A1    Aug. 10, 2023

(30) Foreign Application Priority Data

Feb. 8, 2022   (KR) ........................ 10-2022-0016277

(51) Int. Cl.
| | |
|---|---|
| H02P 27/06 | (2006.01) |
| B60L 50/51 | (2019.01) |
| H02M 7/537 | (2006.01) |
| H02P 6/08 | (2016.01) |
| H02P 25/22 | (2006.01) |

(52) U.S. Cl.
CPC ............. *H02P 27/06* (2013.01); *B60L 50/51* (2019.02); *H02M 7/537* (2013.01); *H02P 6/08* (2013.01); *H02P 25/22* (2013.01)

(58) Field of Classification Search
CPC .. H02P 27/06; H02P 25/22; H02P 6/08; B60L 50/51; H02M 7/537
USPC ........................................................ 318/807
See application file for complete search history.

(56) References Cited

U.S. PATENT DOCUMENTS

| | | | |
|---|---|---|---|
| 10,581,361 B2 | 3/2020 | Chen et al. | |
| 11,018,616 B2 * | 5/2021 | Hirotani | .................... H02P 4/00 |
| 2009/0033253 A1 | 2/2009 | Nagashima et al. | |

(Continued)

FOREIGN PATENT DOCUMENTS

| | | |
|---|---|---|
| JP | 2005-124366 | 5/2005 |
| JP | 2010-178596 | 8/2010 |

(Continued)

OTHER PUBLICATIONS

Kano et al. (CN 105553210 A)Brushless Motor and Motor Control Device Date Published May 4, 2016 (Year: 2016).*

(Continued)

*Primary Examiner* — Jorge L Carrasquillo
(74) *Attorney, Agent, or Firm* — Morgan, Lewis & Bockius LLP (57) ABSTRACT

A motor driving apparatus driving a motor including a plurality of windings corresponding to each of phases, includes a mode change switch and a plurality of inverters that operate the motor in a closed end winding mode or an open end winding mode; and a controller configured for controlling the mode change switch and the plurality of inverters according to a first mode determination result based on a reverse magnetic flux and a second mode determination result according to an output power limit for each mode.

20 Claims, 7 Drawing Sheets

(56) References Cited

U.S. PATENT DOCUMENTS

| | | | |
|---|---|---|---|
| 2021/0305928 A1 | 9/2021 | Jeong et al. | |
| 2022/0368262 A1* | 11/2022 | Huang | B60L 50/51 |
| 2024/0154562 A1* | 5/2024 | Hattori | H02K 16/00 |

FOREIGN PATENT DOCUMENTS

| | | |
|---|---|---|
| JP | 2016-048997 | 4/2016 |
| JP | 6282331 | 2/2018 |
| JP | 6285256 | 2/2018 |
| JP | 2020-191753 | 11/2020 |
| KR | 10-2005-0003732 | 1/2005 |
| KR | 10-1956991 | 3/2019 |
| KR | 10-2021-0122343 | 10/2021 |
| WO | WO2021/181639 | 9/2021 |

OTHER PUBLICATIONS

Zhang et al. (CN 103684196 B)A Permanent Magnet Can Be Switching Winding Synchronous Motor Driving System Date Published Feb. 17, 2016 (Year: 2016).*

* cited by examiner

MOTOR DRIVING APPARATUS AND METHOD FOR CONTROLLING THE SAME

CROSS REFERENCE TO RELATED APPLICATION

The present application claims priority to Korean Patent Application No. 10-2022-0016277 filed on Feb. 8, 2022, the entire contents of which is incorporated herein for all purposes by this reference.

BACKGROUND OF THE PRESENT DISCLOSURE

Field of the Present Disclosure

The present disclosure relates to a motor driving apparatus and a method for controlling the same, and more specifically, to a motor driving apparatus and a method for controlling the same, which may switch a motor driving mode in consideration of an output power limit for each driving element.

Description of Related Art

In general, the winding of each phase included in a motor has one end connected to one inverter and the other ends connected to each other to form a Y-connection.

When the motor is driven, a torque is generated by applying a line voltage to the Y-connected winding of the motor to generate an alternating current as a switching element in the inverter is turned ON/OFF by a pulse width modulation control.

Because the fuel efficiency of an eco-friendly vehicle such as an electric vehicle that utilizes the torque generated by the motor as power is determined by the power conversion efficiency of the inverter-the motor, it is important to maximize the power conversion efficiency of the inverter and the efficiency of the motor to improve the fuel efficiency.

As a motor driving technology capable of improving the efficiency of the system even while covering both low and high output sections with one motor is required in the art, a technology of driving one motor in different modes by use of two inverters and a mode change switch is recently being introduced. Here, one of the different modes is a closed-end winding mode that utilizes a Y-connection structure and utilizes one inverter, and the other is an open-end winding mode that utilizes two inverters together.

However, the criteria for performing the switching between these modes generally follows the time point of entering a flux weakening control in consideration of the torque and reverse magnetic flux of the motor in the inverter used in the closed-end winding mode.

However, there is a problem in that if the switching between the modes is performed in consideration of only the reverse magnetic flux, a sudden change in torque occurs due to a difference in the maximum output torque of the motor between the two modes depending upon an operating point at the corresponding time point when the mode is switched when the required torque is high, worsening torque controllability.

Furthermore, there is a problem in that the output is affected even in the state of the driving element irrelevant to the corresponding mode because in the output control of the general motor driving apparatus, the output power limit is collectively set in consideration of both the states of the two inverters and the change switch in each mode.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus and a method for controlling the same, which may secure torque controllability when a mode is switched.

Furthermore, another object of the present disclosure is to provide a motor driving apparatus and a method for controlling the same, which may set an output power limit more effectively.

The objects of the present disclosure are not limited to the aforementioned objects, and other objects not mentioned will be clearly understood to those skilled in the art to which the present disclosure pertains from the following description.

As a means for achieving the objects, the present disclosure provides a motor driving apparatus including: a motor including a plurality of windings corresponding to each of phases; a mode change switch and a plurality of inverters that operate the motor in a closed end winding mode or an open end winding mode; and a controller configured for controlling the mode change switch and the plurality of inverters according to a first mode determination result based on a reverse magnetic flux and a second mode determination result according to an output power limit for each mode.

For example, if the first mode determination result or the second mode determination result is the open end winding mode, the controller may be configured to control the mode change switch and the plurality of inverters so that the motor is operated in the open end winding mode.

For example, when the first mode determination result and the second mode determination result are the closed end winding mode, the controller may be configured to control the mode change switch and the plurality of inverters so that the motor is operated in the closed end winding mode.

For example, the first mode determination result may be determined according to a result of applying a predetermined hysteresis to a reverse magnetic flux value for each torque to compare it with a current reverse magnetic flux value.

For example, the second mode determination result may be determined depending upon whether to satisfy a current torque instruction for each mode by comparing each of a first output power limit of the closed end winding mode and a second output power limit of the open end winding mode with the current torque instruction.

For example, the controller may be configured to determine the second mode determination result as the closed end winding mode when the closed end winding mode and the open end winding mode may satisfy the current torque instruction.

For example, the controller may be configured to determine the second mode determination result as a mode being currently applied when the closed end winding mode and the open end winding mode may not satisfy the current torque instruction.

For example, the plurality of inverters may include a first inverter including a plurality of first switching elements and connected to a first end of each of the windings and a second inverter including a plurality of second switching elements and connected to a second end of each of the windings.

For example, the first output power limit may be determined based ON states of the first inverter and the mode change switch, and the second output power limit may be determined based ON states of the first inverter and the second inverter.

For example, the mode change switch may include a plurality of third switching elements including each of one ends connected to the second end and another ends connected to each other.

Furthermore, a method for controlling a motor driving apparatus driving a motor including a plurality of windings corresponding to each of phases through a mode change switch and a plurality of inverters may include: determining a reverse magnetic flux, a first output power limit in a closed end winding mode, and a second output power limit in an open end winding mode; performing a first mode determination based on the determined reverse magnetic flux and a second mode determination based on the first output power limit and the second output power limit; determining a driving mode of the motor as the closed end winding mode or the open end winding mode according to a first result of the first mode determination and a second result of the second mode determination; and controlling the mode change switch and the plurality of inverters according to the determined driving mode.

For example, the determining may include determining the driving mode as the open end winding mode when the first result or the second result is the open end winding mode.

For example, the determining may include determining the driving mode as the closed end winding mode when the first result and the second result are the closed end winding mode.

For example, the first result may be determined according to a result of applying a predetermined hysteresis to a reverse magnetic flux for each torque to compare it with a current reverse magnetic flux value, and the second result may be determined depending upon whether to satisfy a current torque instruction for each mode by comparing each of the first output power limit and the second output power limit with the current torque instruction.

For example, the plurality of inverters may include a first inverter including a plurality of first switching elements and connected to a first end of each of the windings and a second inverter including a plurality of second switching elements and connected to a second end of each of the windings, the first output power limit may be determined based ON states of the first inverter and the mode change switch, and the second output power limit may be determined based ON states of the first inverter and the second inverter.

The motor driving apparatus may switch the driving mode of the motor depending upon the situation, achieving the high efficiency in the CEW mode and producing the high output in the OEW mode.

Furthermore, it is possible to exclude the element not substantially involved in the operation of the corresponding mode in determining the output power limit for each mode in the determination of the motor driving mode, preventing the unnecessary output limit.

Furthermore, it is possible to perform the conventional reverse magnetic flux-based motor driving mode determination and to perform the output limit-based mode determination together, preventing the sudden change in torque in the high torque instruction situation and following the torque instruction as much as possible.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment disclosed in the present specification will be described in detail with reference to the accompanying drawings, and the same or similar components are indicated by the same reference numerals regardless of reference numerals, and the overlapping description thereof will be omitted. The suffixes "module" and "part" for the components used in the following description are provided or interchangeably used in consideration of only the ease of writing the specification, and do not have distinct meanings or roles in themselves. Furthermore, in the description of the exemplary embodiment disclosed in the exemplary embodiment, if it is determined that detailed descriptions of related known technologies may obscure the gist of the exemplary embodiment disclosed in the exemplary embodiment, the detailed descriptions thereof will be omitted. Furthermore, it should be understood that the accompanying drawings are only for easy understanding of the exemplary embodiment disclosed in the exemplary embodiment, the technical spirit disclosed in the exemplary embodiment of the present disclosure is not limited by the accompanying drawings, and all changes, equivalents, or substitutes included in the spirit and technical scope of the present disclosure are included in the scope of the present disclosure.

Terms including ordinal numbers such as first and/or second may be used to describe various components, but the components are not limited by the terms. The terms are used only for distinguishing one component from another component.

When a certain component is said to be "connected" or "coupled" to another component, it may be directly connected or coupled to another component, but it should be understood that other components may also exist therebetween. On the other hand, when a certain component is said to be "directly connected" or "directly coupled" to another component, it should be understood that no other elements exist therebetween.

The singular expression includes the plural expression unless the context clearly described otherwise.

In the exemplary embodiment, it should be understood that terms such as "comprise" or "have" specifies the presence of the feature, number, step, operation, component, part, or a combination thereof described in the specification, but does not exclude the presence or addition possibility of one or more other features, numbers, steps, operations, components, parts, or combinations thereof in advance.

Furthermore, a unit or a control unit included in the names of a motor control unit (MCU), a hybrid control unit (HCU), etc. is only the term widely used in the naming of a controller that is configured to control a specific function of a vehicle, and does not mean a generic function unit. For example, each control unit may include a communication with device communicating other control units or a sensor to control the function in charge, a memory storing an operation system or a logic command input/output information, and one or more processors performing determination, operation, decision, etc. necessary for controlling the function in charge.

Figure 1:
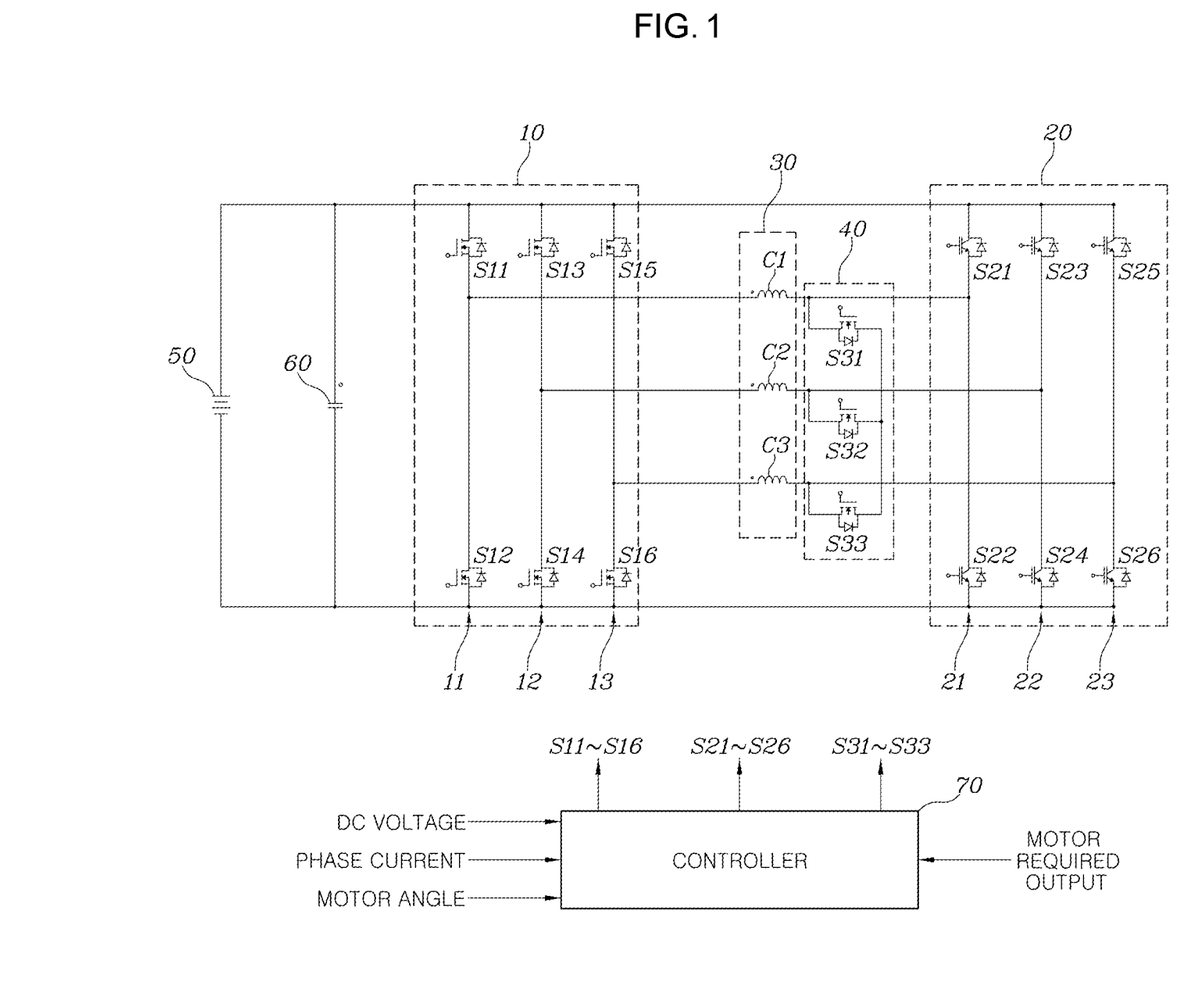
FIG. 1 is a circuit view of a motor driving apparatus applicable to exemplary embodiments of the present disclosure.

FIG. 1 is a circuit view of a motor driving apparatus applicable to exemplary embodiments of the present disclosure.

Referring to FIG. 1, a motor driving apparatus according to an exemplary embodiment as the motor driving apparatus that supplies a driving power to a motor 30 including a plurality of windings C1, C2 and C3 corresponding to each of phases may include a first inverter 10 including a plurality of first switching elements S11, S12, S13, S14, S15 and S16 and connected to a first end of each of the windings of the motor 30, a second inverter 20 including a plurality of second switching elements S21, S22, S23, S24, S25 and S26 and connected to a second end of each of the windings of the motor 30, a plurality of third switching elements S31, S32 and S33 including one ends connected to the second end of each of the windings of the motor 30 and the other ends connected to each other, and a controller 70 controlling ON/OFF states of the first switching elements S11 to S16, the second switching elements S21 to S26, and the third switching elements S31, S32 and S33 based on the required output of the motor 30.

The first inverter 10 and the second inverter 20 may convert the DC power stored in a battery 50 into a three-phase AC power to provide it to the motor 30, or convert the regenerative braking energy generated by generating a regenerative braking torque of the motor 30 upon regenerative braking into a DC to provide it to the battery 50. The present conversion between the DC power and the AC power may be performed by a pulse width modulation control of the plurality of first switching elements S11, S12, S13, S14, S15 and S16 and the plurality of second switching elements S21, S22, S23, S24, S25 and S26 provided in each of the first inverter 10 and the second inverter 20.

The first inverter 10 may include a plurality of legs 11, 12 and 13 to which a DC voltage formed in a DC link capacitor 60 connected between both ends of the battery 50 is applied. Each of the legs 11, 12 and 13 may correspond to each of the phases of the motor 30 to form the electrical connection.

The second inverter 20 may also have a configuration similar to that of the first inverter 10. The second inverter 20 may include a plurality of legs 21, 22 and 23 to which a DC voltage formed in the DC link capacitor 300 connected between both ends of the battery 50 is applied. Each of the legs 21, 22 and 23 may correspond to each of the phases of the motor 30 to form the electrical connection.

The plurality of third switching elements 40 have each of one ends connected to the other end of each of the windings C1, C2 and C3 included in the motor 30 and another ends connected to each other.

In the present connection structure, if the third switching element 40 is turned on, the other ends of the windings C1, C2 and C3 of the motor 30 form the electrical connection to each other, and therefore, the motor 30 has a Y-connected winding structure including a neutral point. Therefore, in a state where the plurality of third switching elements 40 are turned on, the motor 30 may be driven by deactivating the second inverter 20 (turning off all of the plurality of second switching elements S21 to S26) and switching only the first switching elements S11, S12, S13, S14, S15 and S16 of the first inverter 10 through the pulse width modulation control.

If the third switching element 40 is turned off, each of both ends of the windings C1, C2 and C3 of the motor 30 is in a state of being connected to the first inverter 10 and the second inverter 20. Therefore, in the state where the plurality of third switching elements 40 are turned off, the motor 30 may be driven by activating both the first inverter 10 and the second inverter 20 to switch all of the first switching elements S11, S12, S13, S14, S15 and S16 and the second switching elements S21, S22, S23, S24, S25 and S26 through the pulse width modulation control.

In the art, a mode in which the motor 30 is driven by turning on the third switching element 40 to connect the other ends of the windings C1, C2 and C3 of the motor 30 and activating only the first inverter 10 may be referred to as a closed end winding (CEW) mode or a Y-connected mode, and a mode in which the motor 30 is driven by turning off the third switching element 40 and activating both the first inverter 10 and the second inverter 20 connected to both ends of the windings C1, C2 and C3 of the motor 30, respectively may be referred to as an open end winding (OEW) mode. Therefore, the plurality of third switching elements 40 may be referred to as 'mode change switches'.

Various switching means known in the art, such as a MOSFET, an IGBT, a thyristor, and a relay, may be employed as the third switching elements S31, S32 and S33.

The controller 70 is basically an element that switches the switching elements S11, S12, S13, S14, S15 and S16 and S21, S22, S23, S24, S25 and S26 included in the first inverter 10 and the second inverter 20 through the pulse width modulation control so that the motor 30 may be driven based on the required output required for the motor 30. According to various exemplary embodiments of the present disclosure, the controller 70 may determine the driving mode of the motor based on the required output of the motor 30, determine the ON/OFF states of the third switching element 40 according to the mode, and switch the switching elements of the inverters activated according to the mode through the pulse width modulation control.

The motor driving apparatus described above with reference to FIG. 1 may perform the switching between the modes depending upon the criteria set in consideration of the reverse magnetic flux. This will be described with reference to FIG. 2.

Figure 2:
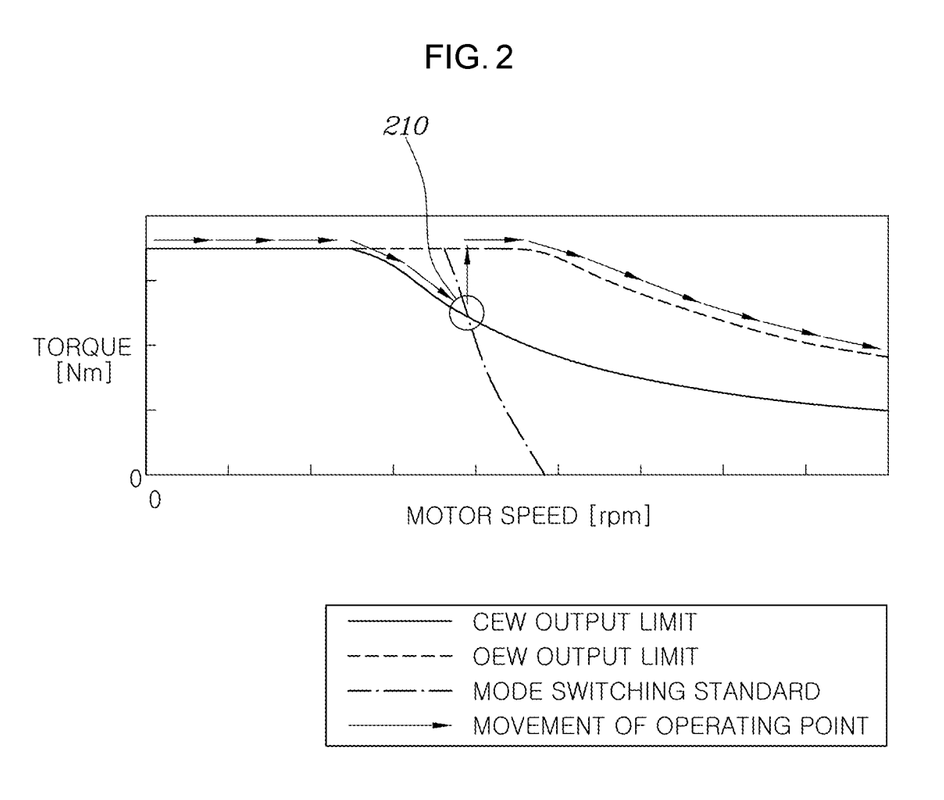
FIG. 2 is a view for explaining a general mode switching criteria based on magnetic flux.

FIG. 2 is a view for explaining a general mode switching criteria based on magnetic flux.

In the graph shown in FIG. 2, the horizontal axis indicates a speed of the motor, and the vertical axis indicates a torque of the motor. Referring to FIG. 2, it may be seen that a greater output may be produced in the OEW mode that utilizes both the two inverters 10, 20 than in the CEW mode that utilizes the first inverter 10. On the other hand, a mode switching (standard) line is set near the middle of the graph. The mode switching line is to connect an operating point at which a flux weakening entry control for the first inverter 10 starts in the CEW mode in consideration of the reverse magnetic flux of the motor. In general, in controlling the motor driving apparatus, the motor is driven in the CEW mode in an operating point region on the left of the mode switching line, and the motor is driven in the OEW mode in an operating point region on the right thereof.

However, when only the reverse magnetic flux is considered as described above, a problem of torque controllability occurs when a high demand torque (i.e., torque instruction) is maintained. For example, if the vehicle is accelerated by the torque instruction of the maximum available torque level in the stopped state, the vehicle starts in CEW mode to maintain the maximum torque along a CEW output power limit line indicated by the arrow shown in FIG. 2, and the revolutions per minute (rpm) of the motor will increase. As the RPM increases, the maximum torque also starts to decrease depending upon the output power limit set in the CEW mode, but the CEW mode is maintained until the operating point meets the mode switching line. However, the mode will be switched to the OEW mode at a point 210 where the current operating point meets the mode switching line. At the instant time, because the maximum torque of the OEW mode is large at a speed at the time point of switching and the high demand torque is also maintained as it is, the maximum torque will be output within the output power limit line of the OEW mode to satisfy (execute) the required torque together with the mode switching. As a result, the torque controllability may become unstable because an instantaneous sudden change in torque occurs as much as a difference between the maximum torque according to the output power limit of the CEW mode and the maximum torque according to the output power limit of the OEW mode at the corresponding RPM.

Furthermore, in the control of the general motor driving apparatus, the output power limit is collectively applied when failure or de-rating occurs only in any one of the first inverter 10, the second inverter 20, and the third switching element 40 in consideration of the states of all thereof in both the CEW mode and the OEW mode. For example, when the first inverter 10 and the third switching element 40 are operated normally in the CEW mode, a substantial problem does not occur in performing the CEW mode even if the second inverter 20 is failed, but when the second inverter 20 is failed, the output power limit is applied to the CEW mode. For another example, if the de-rating occurs due to the over-temperature of the third switching element 40, the output power limit is applied to the CEW mode but because the third switching element 40 is turned off in the OEW mode, the output power limit is applied to the OEW mode due to the abnormality of the third switching element 40 even if there is no problem with the de-rating. This will be described with reference to FIG. 3.

Figure 3:
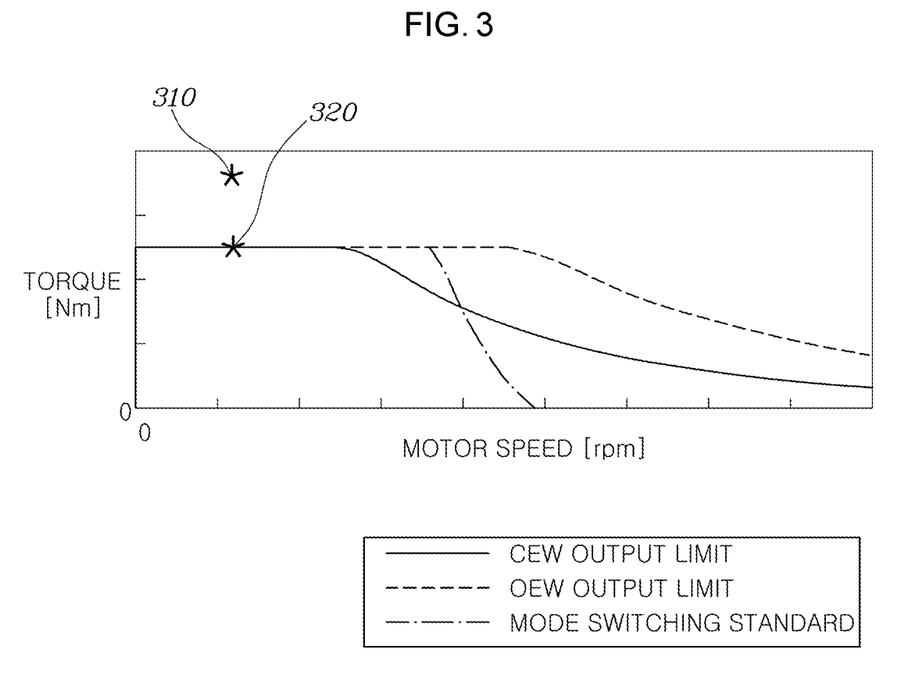
FIG. 3 is a view for explaining an example of a general form of an output power limit control.

FIG. 3 is a view for explaining an example of a general output power limit control format.

FIG. 3 shows a situation where the output power limit is collectively applied to each of the OEW mode and the CEW mode according to the general control method due to the de-rating of the third switching element 40. In the instant case, there is a problem in that it is not possible to execute a torque instruction 310 and it is possible to output only a maximum torque 320 according to the output power limit because the output power limit is applied up to the OEW mode even if there is substantially no influence on the OEW mode. In other words, it is difficult to satisfy the corresponding torque instruction 310 in the CEW mode in the de-rating situation of the third switching element 40, but because the normal operation of the OEW mode is possible, it is possible to satisfy the torque instruction 310 when an unnecessary output power limit is not applied to the OEW mode.

Therefore, an exemplary embodiment of the present disclosure proposes to consider not only the reverse magnetic flux but also the required torque in performing the mode switching and to differently set conditions of the output power limit for each motor driving mode.

Figure 4:
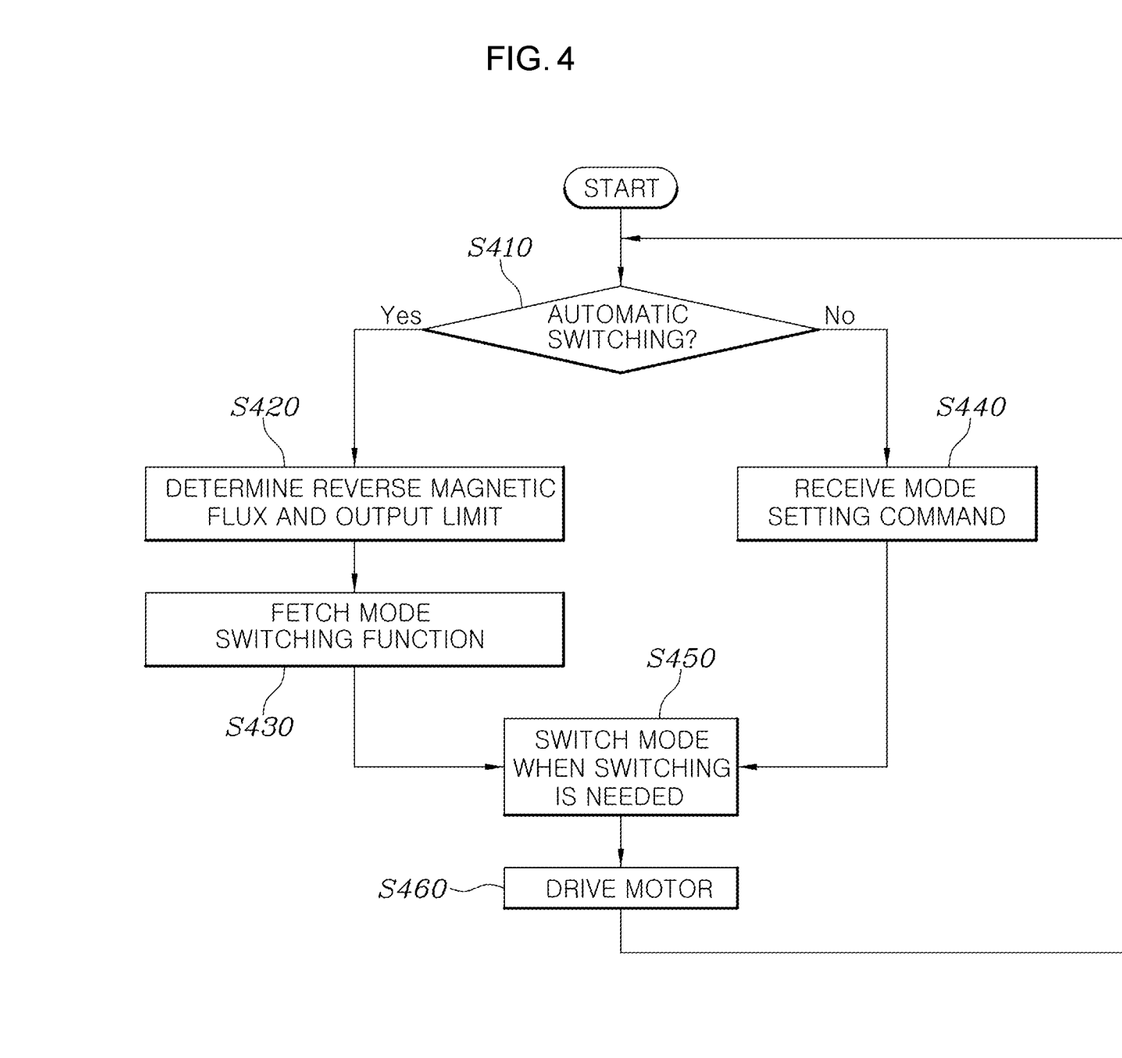
FIG. 4 is a flowchart showing an example of a motor driving mode control process according to an exemplary embodiment of the present disclosure.

FIG. 4 is a flowchart showing an example of a motor driving mode control process according to an exemplary embodiment of the present disclosure.

Referring to FIG. 4, the controller 70 may determine whether an automatic mode switching is currently set (S410) and determine the reverse magnetic flux and the output power limit (S420) if the automatic switching is set (Yes in S410).

Here, the determination of the reverse magnetic flux is to perform the operation considering efficiency, and may take the form of referring to a one-dimensional map in which the reverse magnetic flux is defined for each torque but is not necessarily limited thereto. Furthermore, the determination of the output power limit is to maximize the output for each driving mode and to satisfy (execute) the required torque (torque instruction), and may take the form of referring to a two-dimensional map in which the output power limit is previously defined for each voltage and speed but is not necessarily limited thereto.

Furthermore, the output power limit may be determined for each of the CEW mode and the OEW mode, and in the CEW mode, a lower value of the output power limit value according to the state of the first inverter 10 and the output power limit value according to the state of the third switching element 40 may be applied. At the instant time, because the second inverter 20 is not operated, the output power limit according to the state of the second inverter 20 may not be applied.

For example, the output power limit value of the CEW mode may be determined like 'Min(INV1, SPL)', where INV1 may refer to the output power limit value according to the state of the first inverter 10, and SPL means the switching (SPLit) and may refer to the output power limit value according to the state of the third switching element 40.

In the OEW mode, the lower value of the output power limit value according to the state of the first inverter 10 and the output power limit value according to the state of the second inverter 20 may be applied. At the instant time, because the third switching element 40 is not operated, the output power limit according to the state of the third switching element 40 may not be applied.

For example, the output power limit value of the OEW mode may be determined like 'Min(INV1, INV2)', where INV2 may refer to the output power limit value according to the state of the second inverter 20.

As described above, in determining the output limit, only the state of an element substantially necessary for implementing the mode may be referred for each mode, preventing the unnecessary output power limit from being applied.

When the reverse magnetic flux and the output power limit are determined, the mode switching function may be fetched to determine the motor driving mode based on the reverse magnetic flux and the output power limit (S430). A specific form of the mode switching function will be described later with reference to FIG. 5.

Meanwhile, when the automatic switching is not set (No in S410), the controller 70 may wait for reception of a command for setting the motor driving mode, and determine the motor driving mode corresponding to the corresponding command when receiving the command (S440). The command for setting the motor driving mode may also be input through an operation of a dedicated operation means (e.g., physical/virtual key button or dial), and also be input through the setting through a user setting menu (user setting menu: USM) but these are illustrative and are not necessarily limited thereto.

If the motor driving mode is determined, the controller 70 may maintain the current mode when the current mode and the determined mode are the same, and otherwise, perform the mode switching (S450). Since the specific form of performing the mode switching is the same as described above with reference to FIG. 1, the overlapping description will be omitted.

Thereafter, the controller 70 may drive the motor through the pulse width modulation control for the first to third switching elements depending upon the determined mode (S460).

If a vehicle in which the controller 70 or the motor driving apparatus is mounted is implemented not to support a manual mode setting, the steps (S410 and S440) may be omitted.

Hereinafter, the mode switching function will be described with reference to FIG. 5.

Figure 5:
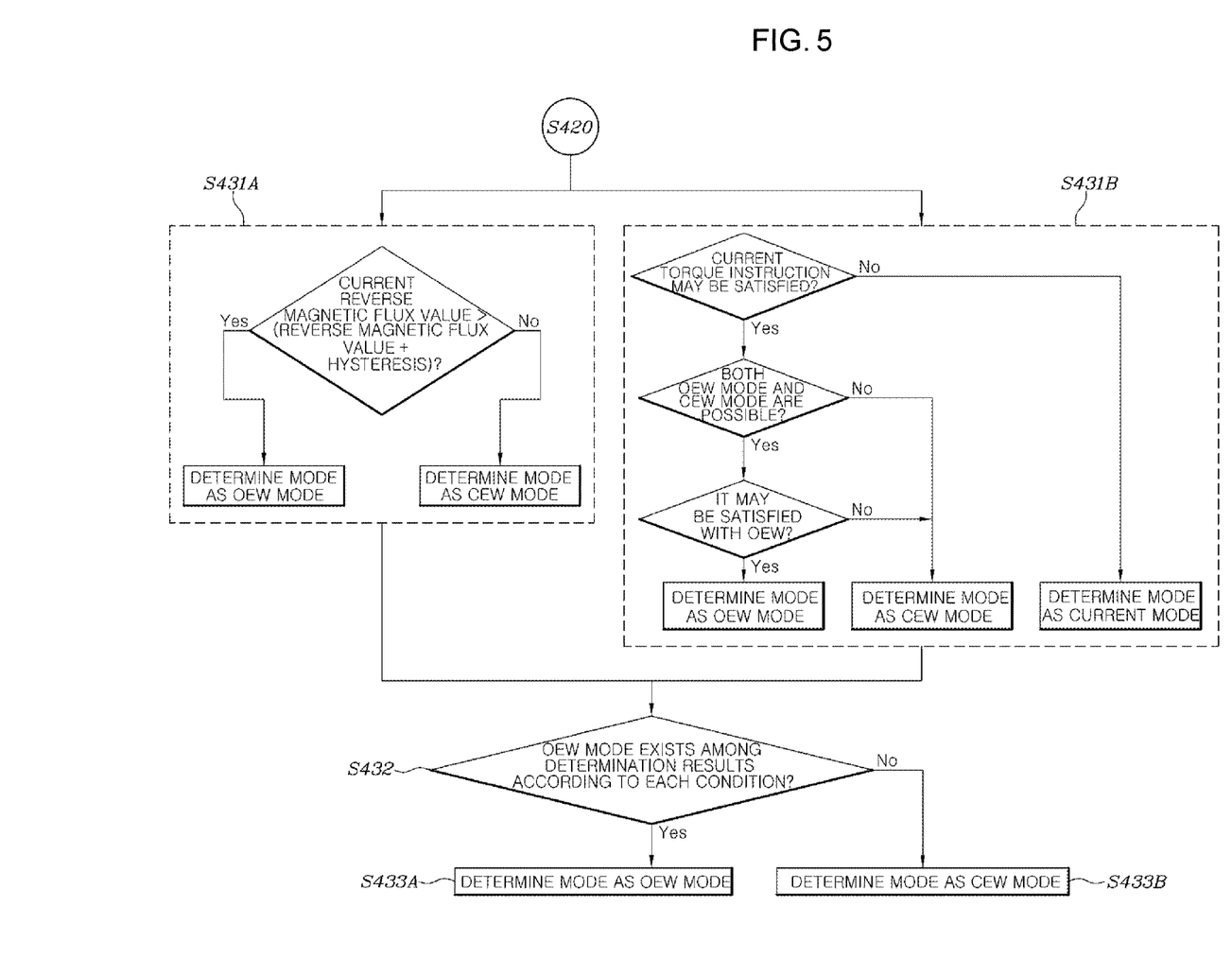
FIG. 5 shows an example of a configuration of a mode switching function according to the exemplary embodiment of the present disclosure.

FIG. 5 shows an example of a configuration of a mode switching function according to the exemplary embodiment of the present disclosure.

Referring to FIG. 5, to determine the motor driving mode, each of a reverse magnetic flux condition-based mode determination (S431A) and an output power limit condition-based mode determination (S431B) may be independently performed.

The reverse magnetic flux condition-based mode determination (S431A) may be performed to determine the mode as the OEW mode if the current reverse magnetic flux value determined in the step S420 is greater than a value obtained by adding a predetermined hysteresis to a reverse magnetic flux value, and otherwise, may be performed to determine the mode as the CEW mode. Here, the reverse magnetic flux value may be obtained from a table in which reverse magnetic flux values for each torque are defined. Alternatively, to determine the mode as the CEW mode, it may also be necessary to satisfy a condition such as 'current reverse magnetic flux value<reverse magnetic flux table value for each torque–hysteresis', but the present disclosure is not necessarily limited thereto. For example, the reverse magnetic flux condition-based mode determination (S431A) may also be performed based on the relative position between the current operating point and the mode switching line shown in FIG. 2.

Meanwhile, the output power limit condition-based mode determination (S431B) may be performed by comparing the current torque instruction with the torque corresponding to the output power limit value for each mode to i) maintain the current mode if both the CEW mode and the OEW mode may not satisfy the torque instruction, ii) determine the mode as the CEW mode in consideration of efficiency if both the OEW mode and the CEW mode may satisfy the torque instruction, and iii) determine the mode as the satisfactory corresponding mode if only any one of the CEW mode and the OEW mode may satisfy the torque instruction.

Thereafter, as the results of the reverse magnetic flux condition-based mode determination (S431A) and the output power limit condition-based mode determination (S431B), when the OEW mode exists (Yes in S432), the OEW mode may be determined as the determination result of the mode switching function (S433A). On the other hand, when the OEW mode does not exist (No in S432), the CEW mode may be determined as the determination result of the mode switching function (S433B).

As a result, the mode switching function determines the mode as the OEW mode [if 'the result of the reverse magnetic flux condition-based mode determination (S431A) is the OEW mode' OR 'the result of the output power limit condition-based mode determination (S431B) is the OEW mode'].

The mode switching function shown in FIG. 5 may be fetched in a certain period. In the instant case, the 'i) the maintenance of the current mode' in the output power limit condition-based mode determination (S431B) may mean the determination result of a previous period. For example, the period may be 1 ms, but this is illustrative and is not necessarily limited thereto.

Figure 6:
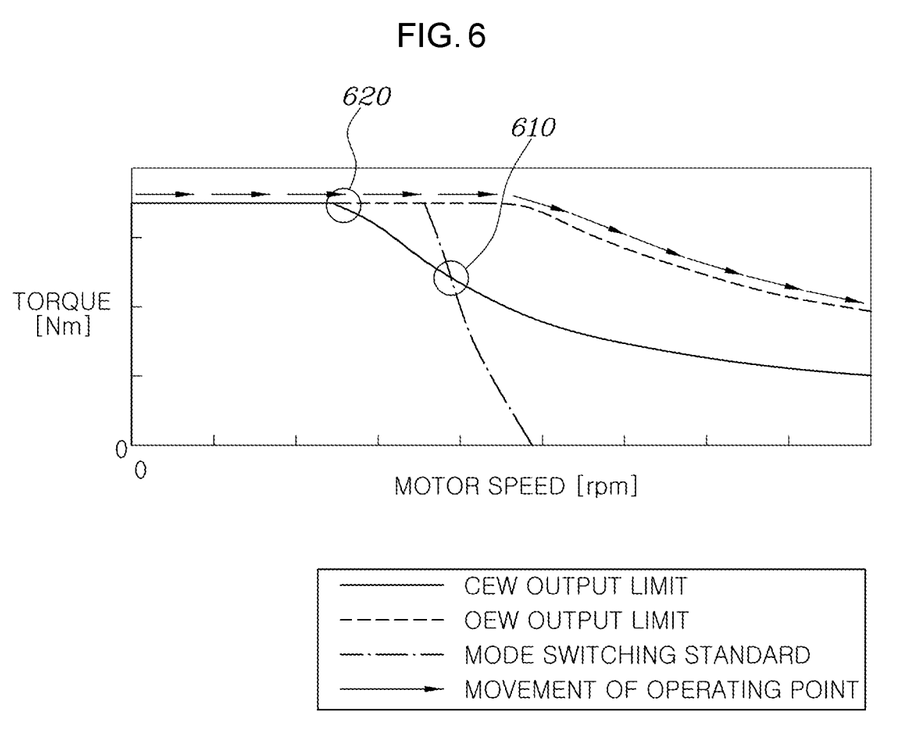
FIG. 6 and FIG. 7 are views for explaining the effects of a method for controlling the motor driving apparatus according to the exemplary embodiment of the present disclosure.
Figure 7:
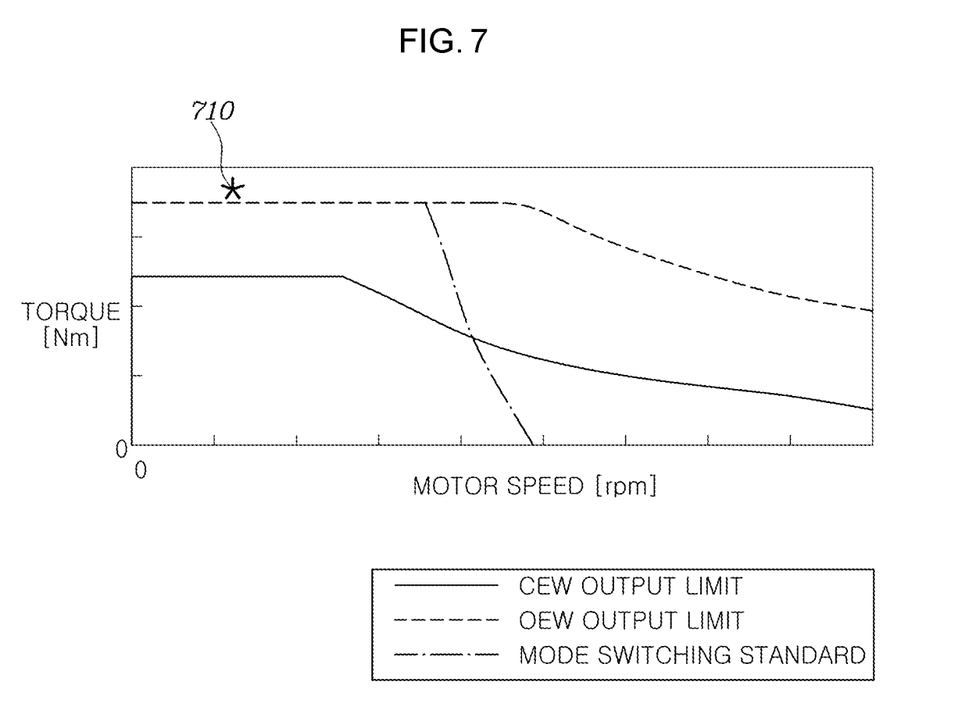

FIG. 6 and FIG. 7 are views for explaining the effects of a method for controlling the motor driving apparatus according to the exemplary embodiment of the present disclosure.

First, a situation similar to that of FIG. 2 is assumed in FIG. 6. In other words, it is a situation where the vehicle starts in the CEW mode in the stopped state, and the required torque (torque instruction) is highly maintained. In the instant case, in the general control, the operating point as described above with reference to FIG. 2 moves along the output power limit of the CEW mode up to a point 610 in contact with the mode switching line, suddenly changing the torque. However, in the control method according to the exemplary embodiment of the present disclosure, as the required torque may be satisfied in the OEW mode at the point 620 where the CEW mode may not satisfy the required torque, that is, as the mode is determined as the OEW mode in the output power limit condition-based mode determination (S431B), the switching to the OEW mode may be performed depending upon the OR condition regardless of the result of the reverse magnetic flux condition-based determination (S431A). As a result, according to the exemplary embodiment of the present disclosure, it is possible not only to satisfy the required torque as much as possible according to the switching to the OEW mode, and but also to prevent the sudden change in torque.

Next, a situation where the de-rating occurs in the third switching element 40 is assumed in FIG. 7. In the instant case, the output power limit of the OEW mode, which is not substantially affected by the state of the third switching element 40 in the general control situation described above with reference to FIG. 3, is also lowered to the same level as in the CEW mode. However, according to the exemplary embodiment of the present disclosure, the influence according to the states of the first inverter 10 and the second inverter 20 is considered in the OEW mode in determining the output torque limit, maintaining the output power limit of the OEW mode regardless of the state of the third switching element 40. Therefore, because the torque instruction is satisfied only in the OEW mode by the output power limit condition-based mode determination (S431B) even if the operating point corresponding to the torque instruction 710 is determined as the CEW mode by the reverse magnetic flux condition-based mode determination (S431A), the mode may be determined as the OEW mode and the OEW mode may be applied depending upon the OR condition. Therefore, the controller 70 may drive the motor in the OEW mode to satisfy the torque instruction.

The method for controlling the motor driving apparatus according to the exemplary embodiments of the present disclosure described so far has been described by assuming the motor driving apparatus shown in FIG. 1, but this is illustrative and it is apparent to those skilled in the art that the method may also be applied to a motor driving apparatus having a configuration different from that of the motor driving apparatus shown in FIG. 1 as long as the switching between the CEW mode and the OEW mode is possible.

As described above, the motor driving apparatus according to various exemplary embodiments of the present disclosure may switch the driving mode of the motor depending upon the situation, achieving the high efficiency in the CEW mode and producing the high output in the OEW mode.

Furthermore, it is possible to exclude the element not substantially involved in the operation of the corresponding mode in determining the output power limit for each mode in the determination of the motor driving mode, preventing the unnecessary output limit.

Furthermore, it is possible to perform the conventional reverse magnetic flux-based motor driving mode determination and to perform the output limit-based mode determination together, preventing the sudden change in torque in the high torque instruction situation and following the torque instruction as much as possible.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium having such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus comprising:
    a motor including a plurality of windings corresponding to each of phases;
    a mode change switch and a plurality of inverters configured to operate the motor in a closed end winding mode in which the motor is driven by turning on the mode change switch to connect one ends of the plurality of windings and activating one inverter among the plurality of inverters or an open end winding mode in which the motor is driven by turning off the mode change switch and activating the plurality of inverters connected to both ends of the plurality of windings; and
    a controller electrically connected to the mode change switch and the plurality of inverters and configured to control the mode change switch and the plurality of inverters according to a first mode determination result based on a reverse magnetic flux and a second mode determination result according to an output power limit for each mode.

2. The motor driving apparatus of claim 1,
    wherein when the first mode determination result or the second mode determination result is determined as the open end winding mode, the controller is further configured to control the mode change switch and the plurality of inverters so that the motor is operated in the open end winding mode.

3. The motor driving apparatus of claim 1,
    wherein when the first mode determination result and the second mode determination result are determined as the closed end winding mode, the controller is further configured to control the mode change switch and the plurality of inverters so that the motor is operated in the closed end winding mode.

4. The motor driving apparatus of claim 1,
    wherein the first mode determination result is determined according to a result of applying a predetermined hysteresis to a reverse magnetic flux value for each torque to compare a value obtained by applying the predetermined hysteresis to the reverse magnetic flux value with a current reverse magnetic flux value.

5. The motor driving apparatus of claim 1,
    wherein the second mode determination result is determined depending upon whether a current torque instruction is configured to be executed in each mode by comparing each of a first output power limit of the closed end winding mode and a second output power limit of the open end winding mode with the current torque instruction.

6. The motor driving apparatus of claim 5,
wherein the controller is further configured to determine the second mode determination result as the closed end winding mode when the current torque instruction is configured to be executed in the closed end winding mode and the open end winding mode.

7. The motor driving apparatus of claim 5,
wherein the controller is further configured to determine the second mode determination result as a mode being currently applied when the current torque instruction is unable to be executed in the closed end winding mode and the open end winding mode.

8. The motor driving apparatus of claim 5,
wherein the plurality of inverters include a first inverter including a plurality of first switching elements and connected to a first end of each of the windings and a second inverter including a plurality of second switching elements and connected to a second end of each of the windings.

9. The motor driving apparatus of claim 8,
wherein the first output power limit is determined based on states of the first inverter and the mode change switch, and
wherein the second output power limit is determined based on states of the first inverter and the second inverter.

10. The motor driving apparatus of claim 8,
wherein the mode change switch includes a plurality of third switching elements including each of one ends connected to the second end of each of the windings and another ends connected to each other.

11. A method for controlling a motor driving apparatus driving a motor including a plurality of windings corresponding to each of phases through a mode change switch and a plurality of inverters, the method comprising:
determining, by a controller, a reverse magnetic flux, a first output power limit in a closed end winding mode in which the motor is driven by turning on the mode change switch to connect one ends of the plurality of windings and activating one inverter among the plurality of inverters, and a second output power limit in an open end winding mode in which the motor is driven by turning off the mode change switch and activating the plurality of inverters connected to both ends of the plurality of windings;
performing, by the controller, a first mode determination based on the determined reverse magnetic flux and a second mode determination based on the first output power limit and the second output power limit;
determining, by the controller, a driving mode of the motor as the closed end winding mode or the open end winding mode according to a first result of the first mode determination and a second result of the second mode determination; and
controlling, by the controller, the mode change switch and the plurality of inverters according to the determined driving mode.

12. The method of claim 11,
wherein the determining includes determining the driving mode as the open end winding mode when the first result or the second result is the open end winding mode.

13. The method of claim 11,
wherein the determining includes determining the driving mode as the closed end winding mode when the first result and the second result are the closed end winding mode.

14. The method of claim 11,
wherein the first result is determined according to a result of applying a predetermined hysteresis to a reverse magnetic flux for each torque to compare a value obtained by applying the predetermined hysteresis to the reverse magnetic flux value with a current reverse magnetic flux value.

15. The method of claim 11,
wherein the second result is determined depending upon whether a current torque instruction for each mode is configured to be executed by comparing each of the first output power limit and the second output power limit with the current torque instruction.

16. The method of claim 15,
wherein the controller is further configured to determine the second result as the closed end winding mode when the current torque instruction is configured to be executed in the closed end winding mode and the open end winding mode.

17. The method of claim 15,
wherein the controller is further configured to determine the second result as a mode being currently applied when the current torque instruction is unable to be executed in the closed end winding mode and the open end winding mode.

18. The method of claim 11,
wherein the plurality of inverters include a first inverter including a plurality of first switching elements and connected to a first end of each of the windings and a second inverter including a plurality of second switching elements and connected to a second end of each of the windings,
wherein the first output power limit is determined based on states of the first inverter and the mode change switch, and
wherein the second output power limit is determined based on states of the first inverter and the second inverter.

19. The method of claim 18,
wherein the mode change switch includes a plurality of third switching elements including each of one ends connected to the second end of each of the windings and another ends connected to each other.

20. A non-transitory computer readable storage medium on which a program for performing the method of claim 11 is recorded.

* * * * *